US007564202B2

(12) United States Patent
Hsieh

(10) Patent No.: US 7,564,202 B2
(45) Date of Patent: Jul. 21, 2009

(54) DOOR OPENER ERROR-START PREVENTION DEVICE

(76) Inventor: Chung-Hsien Hsieh, 116 Fen Liao Road, Section 1, Lin-Kou Hsiang, Taipei Hsien (TW)

( * ) Notice: Subject to any disclaimer, the term of this patent is extended or adjusted under 35 U.S.C. 154(b) by 223 days.

(21) Appl. No.: 11/706,924

(22) Filed: Feb. 15, 2007

(65) Prior Publication Data

US 2008/0197792 A1 Aug. 21, 2008

(51) Int. Cl.
*H02P 3/00* (2006.01)

(52) U.S. Cl. ................. 318/10; 318/9; 318/3; 318/466; 361/34

(58) Field of Classification Search ..................... 318/3, 318/9, 10, 466; 361/34
See application file for complete search history.

(56) References Cited

U.S. PATENT DOCUMENTS

| | | | | |
|---|---|---|---|---|
| 5,684,372 | A | 11/1997 | Fitzgibbon et al. | |
| 5,841,253 | A | 11/1998 | Fitzgibbon et al. | |
| 6,623,052 | B2 * | 9/2003 | Hansen | 292/336.3 |
| 6,737,823 | B2 * | 5/2004 | Reed et al. | 318/466 |
| 6,749,165 | B2 * | 6/2004 | Immerman | 248/304 |
| 6,814,335 | B2 * | 11/2004 | Immerman | 248/304 |
| 6,825,628 | B2 * | 11/2004 | Heigl et al. | 318/468 |
| 6,859,004 | B2 * | 2/2005 | Hormann | 318/469 |
| 6,873,127 | B2 * | 3/2005 | Murray | 318/286 |
| 6,900,602 | B1 * | 5/2005 | Hsieh | 318/9 |
| 7,109,677 | B1 * | 9/2006 | Gagnon et al. | 318/466 |
| 7,118,143 | B2 * | 10/2006 | L'Heureux et al. | 292/175 |
| 7,240,931 | B1 * | 7/2007 | Casey | 292/341.18 |

* cited by examiner

*Primary Examiner*—Bentsu Ro
*Assistant Examiner*—David S Luo
(74) *Attorney, Agent, or Firm*—Bucknam and Archer

(57) ABSTRACT

A door opener error-start prevention device, the output shaft of the door opener is formed as a hollow accommodation portion, a pair of axial sliding slots are formed on the periphery, and a sliding pin radially inserted; a pair of elastic elements, abutting against the sliding pin from both ends, the outer end of each elastic element fixed by a bolt; a sprocket assembly is rotationally invaginated on the output shaft, one end having a sprocket , the other end formed with a pair of V-shaped slots corresponding to the sliding slots on the output shaft, both ends of the pin engage in the V-shaped slot to drive the sprocket. When an error start of the door occurs, the door returns to the original position by actuation of an obstacle sensing device actuated by the sliding pin, the sensitivity of which is adjusted by a bolt at the outside of the output shaft.

10 Claims, 4 Drawing Sheets

DOOR OPENER ERROR-START PREVENTION DEVICE

TECHNICAL FIELD

The present invention relates to a device for preventing the error start of door, and particularly to an error start prevention device for door opener, which can actively return to the original position in error-start condition along with the jamming happened between the door and the latch device, and can adjust the sensitivity for obstacle sensing without the need to disassemble the door opener.

BACKGROUND OF THE INVENTION

It is known that the conventional electric door, such as the rolling door or the garage door lifting and descending in vertical direction, or the rolling door rolling in horizontal direction, or the garage door opened and closed by rotating 90 degrees, or the other electrically operated doors, is typically designed with a latch device for jam in consideration of safety. However, ordinary user usually ignore it's existence, and start the door switch without releasing the latch device so that jamming happens between the door and the latch device. In the jammed condition, the door can not be opened, and the latch device can also not be released. There are a lot of disclosures relevant to the prevention of the fault operation of garage door, such as U.S. Pat. No. 5,684,372 and U.S. Pat. No. 5,841,253, etc., but these published disclosures employ the circuit control means to achieve the purpose.

In order to prevent the error start condition, the inventor of the present invention has filed the "DOOR OPENER ERROR-START PREVENTION DEVICE" in U.S. Pat. No. 6,900,602, for example, as shown in FIGS. 1*a* and 1*b*, it comprises: a door opener (20') with one end having a base (21') containing a space, and the other end accommodating a power unit (22') for outputting power; an output shaft (24'), the first end (24*a*') of which is formed with a center hole (241') from the end top along the axial direction and this end is fixed at the center of end gear (23') rotated by the power unit (22'), the second end (24*b*') of which is partially extended and pivoted in the space of the base (21'), and formed with a pair of axial sliding slots (242') from the periphery in the radial direction through the center hole (241'); a sprocket assembly (25'), which is invaginated at the second end (24*b*') of the output shaft (24') for free rotation, one end of the sprocket assembly (25') having a sprocket (251') which moves syschronously with the sprocket on the reel of the rolling door through a chain, the other end being integrally formed with a sleeve (252'), the periphery of the sleeve (252') being formed with a pair of V-shaped slot (253') which corresponds to the sliding slot (242') on the output shaft (24'); a sliding pin (27') being radially inserted in the sliding slot (242') of the output shaft (24') with two ends protruded into the V-shaped slot (253') of the sleeve (252'); a compression spring (28') being inserted in the center hole (241') of the output shaft (24'), one end being fixed by the fastener (29') and the other end being enforced against the sliding pin (27'); a swaying plate (30') provided beside the sliding pin (27'), one end (30*a*') of which-being fixed on the base (21') and the other end being a free end (30*b*'); an obstacle sensing device (31') provided beside the free end (30*b*') of the swaying plate (30'). Under the condition of error start of door and the jam with latch device, the rotation of the door opener (20') is stopped so that the torque of the sliding pin (27') is limited. The sliding pin (27') slides backward toward the direction of larger opening of the V-shaped slot (253') and press the swaying plate (30'). This will trigger the obstacle sensing device (31') to cut off the power of ascending circuit, and supply the reverse current for the door opener (20') to rotate in opposite direction. The rolling door slides down and return to the original position.

In the above invention, an error start prevention device operated with mechanical force is provided, even under the error start condition along with jam between the door and the latch device, it can return actively to the original position. However, the person skilled in the art should understand that the pressure generated by the abutment of the compression spring (28') against the sliding pin (27') is deeply concerned with the trigger sensitivity of the sliding pin (27'). When the pressure is too small, the reaction of the sliding pin (27') will become too sensitive, such that the circuit of obstacle sensing device (31') has a early trip before the confirmation of the obstacle. On the contrary, when the pressure is too large, the reaction of the sliding pin (27') will become relatively slow such that this may cause possible damage to the latch device. Thus, the pressure of the compression spring (28') should be adjusted within an effective range. The inventor has considered that the only latch device (29') in the above-mentioned mechanism for adjusting the pressure of the compression spring (28') is located within the gear box (201') of the door opener (20'), that is, when adjusting the pressure of the compression spring (28'), the door opener (20') has to be disassembled. Therefore there is still some room for improvement.

Moreover, as shown in FIG. 1*c*, a sufficient clearance (d') is maintained between the members of the normal latch device (40') even under the condition of error start, the distance between the door leaving the lower stop point and the jam point, which corresponds to the clearance (d'). In the above invention, because the circuit of the obstacle sensing device (31') is in serial connection with the normally closed contact of the lower limit switch of the door, when the door switch is activated, the normally closed contact of the lower limit switch will be opened after the door leaving the lower stop point. In order for the sensing device (31') to maintain an effective detection distance, a conventional delay circuit is employed to extend the time corresponding to the effective detection distance, so that the circuit of the obstacle sensing device (31') can be kept closed in this time period. After review by the inventors, a simpler and more effective means is found to achieve this purpose, so the present invention is accomplished therewith.

SUMMARY OF INVENTION

The main object of the present invention is to provide an error start prevention device for door opener to improve the defects of the previous inventions. In addition to return actively to the original position under the error-start condition and the jam of door and latch device, the sensitivity of the obstacle sensing device can be adjusted to correspond to the door weight through the bolt at the outside end of the output shaft without the need to disassemble the door opener.

In order to realize this and other objects, the present invention provides an error start prevention device, in which the door opener has a housing with one end having a fixing base and the other end receiving a power unit a gear box located between the two ends, the gear box including a plurality of gears and a last gear that the driving force of the power unit is transmitted to, wherein the device comprises: an output shaft journaled on the housing, one end being extended into the gear box and fixed at the center of the last gear, the other end extended and mounted outside the base, the center of the output shaft being formed as hollow to become an accommodation portion and having a pair of axial sliding slots on the periphery in the radial direction through the accommodation portion; a sprocket assembly rotationally invaginated outside the output shaft, one end having a sprocket for driving the reel of the door, and the other end being integrally formed with a sleeve, the periphery of the sleeve being formed with a pair of V-shaped slots which corresponds to the sliding slots on the output shaft; a sliding pin radially inserted in the sliding slot with both ends protruded and latched in the V-shaped slots respectively; a pair of elastic elements received in the accommodation portion at both ends of the output shaft, the outer end side of each elastic element being fixed by a bolt, while the inner end side abutting against the sliding pin; a swaying plate, located at the position that the sliding pin can abut against, one end of the swaying plate being fixed on the base and the other end being a free end; and an obstacle sensing device located at the position that the free end of the swaying plate can abut against.

According to the present invention, the V-shaped slot on the sleeve includes a narrow portion and a wide portion, which is formed as a gradually larger opening from the narrow portion to the wide portion, and the swaying plate is located at the outside of the opening. In normal condition, both ends of the sliding pin are engaged with the narrow portion of the V-shaped slot respectively to drive the sprocket assembly. When the door is error started and jammed with the latch device, and the rotation of the output shaft of the door opener can not drive the sprocket assembly. The torque of the output shaft makes the sliding pin generating a component force to resist the potential energy of the elastic elements, and sliding backward along the gradually larger opening of the V-shaped slot toward the wide portion direction. During the backward moving, the sliding pin presses the swaying plate and triggers an obstacle sensing device to cut off-the-ascending circuit. Reverse current is supplied by a conventional circuit so that the door opener rotates in opposite direction and the door slides down and returns to the original position. The door opener can be re-started after the jam is removed. Besides, the above structure can selectively adjust the sensitivity of the sliding pin through a bolt provided at the outer side end of the output shaft to corresponds to the weight of the door without the need to disassemble the door opener.

According to the present invention, the sprocket assembly further includes a gear for driving a conventional limit switch device to control the level of upper stop point of the ascending stroke of the door or the level of lower stop point of the descending stroke. Because the circuit of the obstacle sensing device is connected in series with the normally closed contact of the lower limit switch of the door, when the door switch is actuated and the door leaves the lower stop point, the normally closed contact of the lower limit switch will become opened. In order that the obstacle sensing device maintains an effective detection distance, the limit switch device is provided with a delay mechanism which is used to actuate the switch actuator of the switch device to move in lag, so as to extend the time for the effective detection distance of the obstacle sensing device. This is simpler and more effective than the prior art which employs a delay circuit to extend the time of an effective detection distance. It is another object of the present invention.

DETAILED DESCRIPTION OF PREFERRED EMBODIMENTS

Figure 1B:
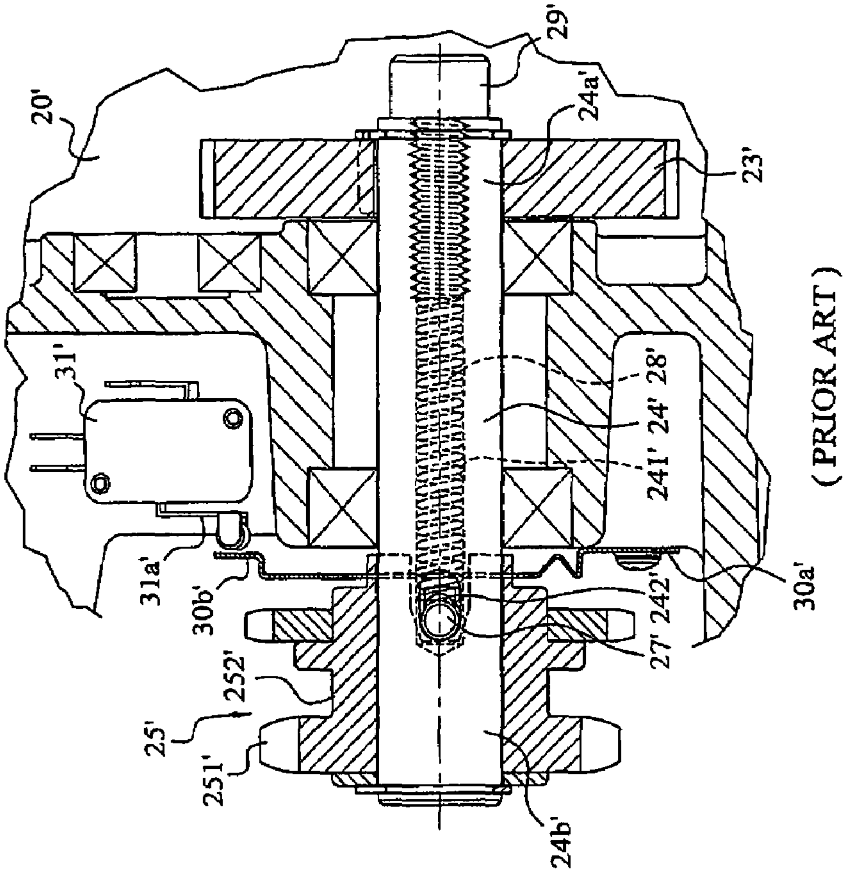
(PRIOR ART) FIG. 1b
FIG. 1*b* is another partial cross-sectional view of the door opener of the prior U.S. Pat. No. 6,900,602 B1 of the inventor.
Figure 1A:
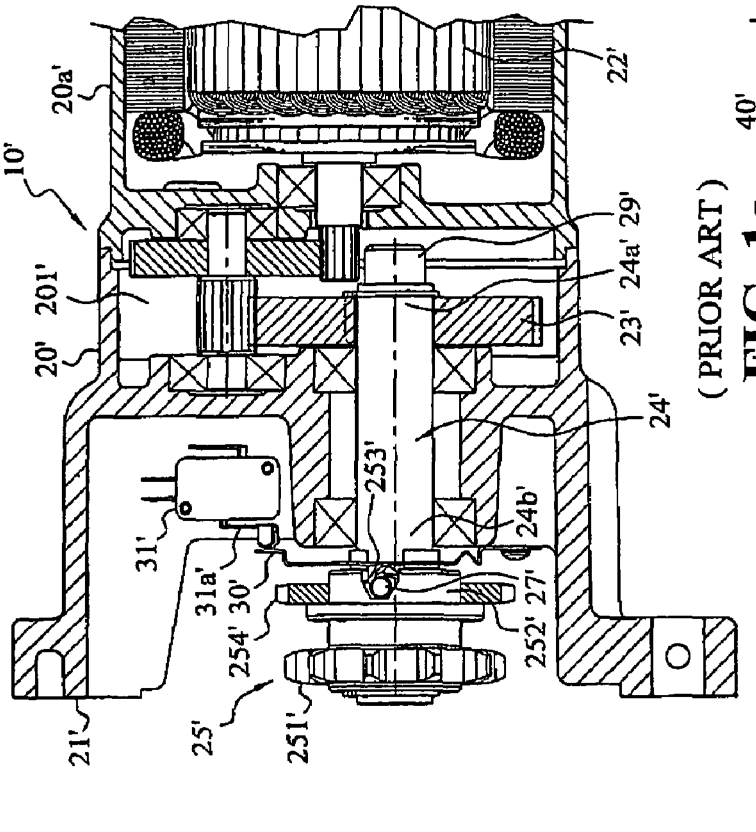
(PRIOR ART) FIG. 1a
FIG. 1*a* is a partial cross-sectional view of the door opener of the prior U.S. Pat. No. 6,900,602 B1 of the inventor.
Figure 1C:
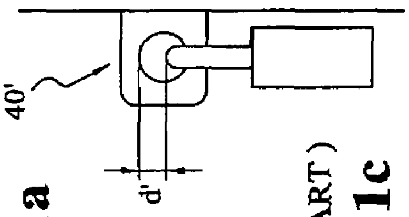
(PRIOR ART) FIG. 1c
FIG. 1*c* is a conventional latch device for locking.
Figure 4:
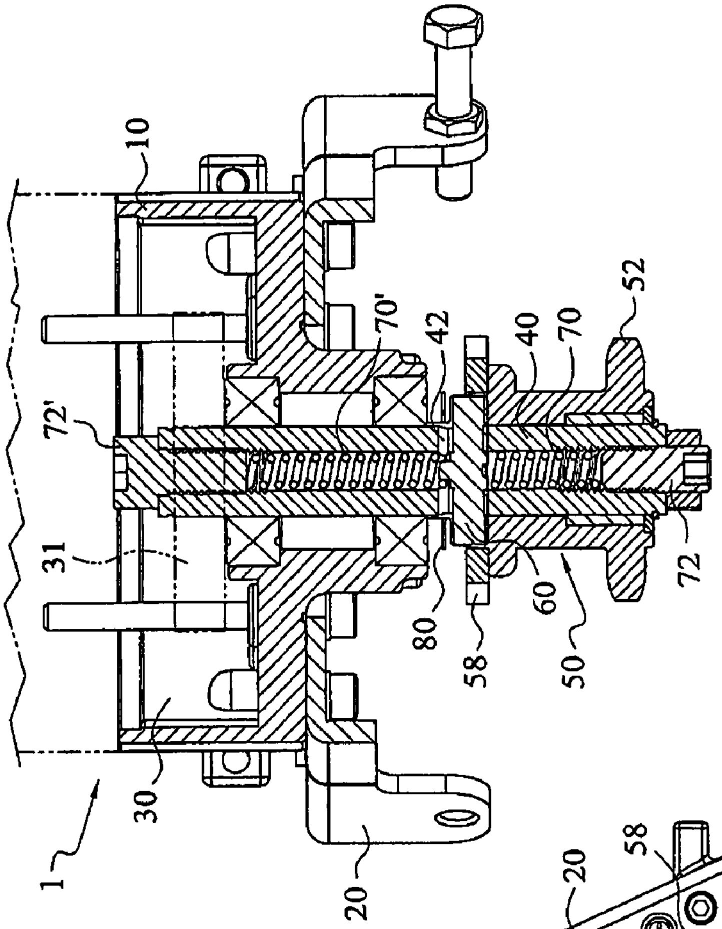
FIG. 4 is a schematic sectional view taken along the line 4-4 in FIG. 3, in which some components are omitted.
Figure 3:
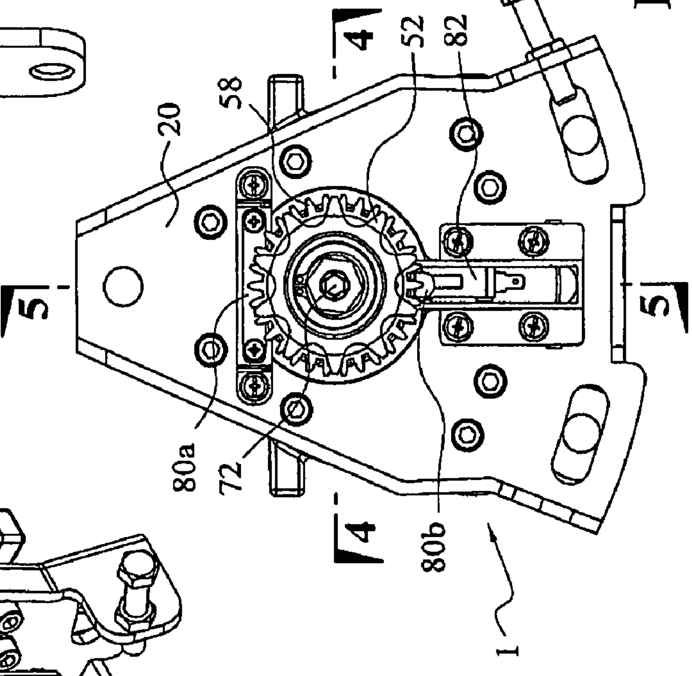
FIG. 3 is a front view of the door opener in FIG. 2.
Figure 2:
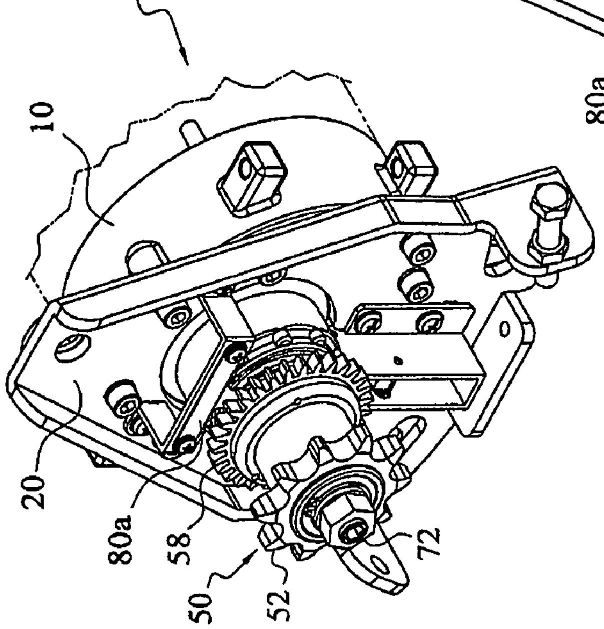
FIG. 2 is a partial perspective view of the door opener for the error start prevention device according to the present invention.

The technological features and advantages of present invention will be further understood with the description of a preferred embodiment of present invention, which is considered to be illustrative purpose only and should not be regarded as limitative, in reference to accompanied drawings.

Referring to FIG. 2 to FIG. 5, the present invention is not involved with the change to the other structure except the door opener. Thus, these drawings only show part of the door opener, and omit the other unrelated members. The error start prevention device for door opener according to the present invention comprises: a door opener 1, having a housing 10 with one end having a fixing base 20 and the other end receiving a power unit (not shown), and a gear box 30 being located between the two ends, the gear box 30 including a plurality of gears and a last gear 31 that the driving force of the power unit is transmitted to; an output shaft 40 rotationally supported on the housing 10, one end being extended into the gear box 30 and fixed at the center of the last gear 31, the other end extended and mounted outside the base 20; the center of the output shaft 40 being formed as hollow to serve as the accommodation portion 41 and formed with a pair of axial sliding slot 42 on the periphery along the radial direction through the accommodation portion 41; a sprocket assembly 50 rotationally invaginated outside the output shaft 40, one end having a sprocket 52 for driving the reel of the door, and the other end be integrally formed with a sleeve 54, and the periphery of the sleeve 54 being formed with a pair of V-shaped slot 56 which corresponds to the sliding slot 42 on the output shaft 40; a sliding pin 60, radially inserted in the sliding slot 42, with both ends being protruded and latched in the V-shaped slots 56 respectively; a pair of elastic elements 70, 70' received in the accommodation portion 41 at both ends of the output shaft 40, the outer end of each elastic element 70,70' being fixed by a bolt 72, 72', while the inner end abutting against the sliding pin 60; a swaying plate 80, located at a position against which the sliding pin 60 can abut, one end 80*a* being fixed on the base 20 and the other end 80*b* being a free end which can swing; an obstacle sensing device 82, located at a position against which the free end 80*b* of the swaying plate 80 can abut for detecting the position of the sliding pin 60. The obstacle sensing device 82 can use for example the contact-type micro switch or optical-type sensor (not shown).

Figure 6:
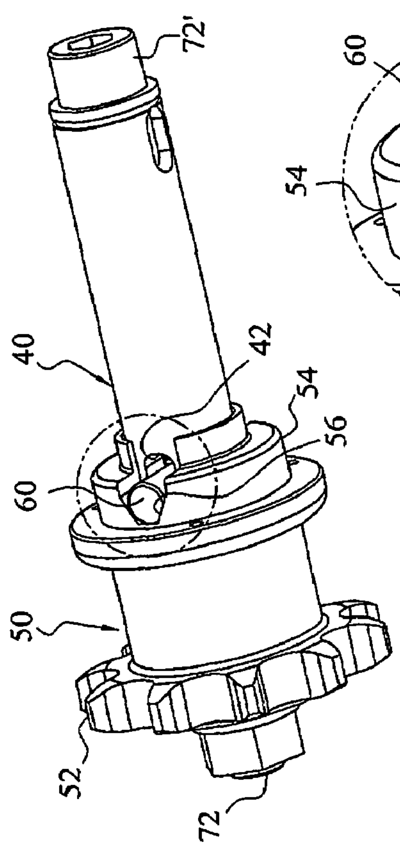
FIG. 6 is a three dimensional view of the output shaft for the door opener according to the present invention.
Figure 6A:
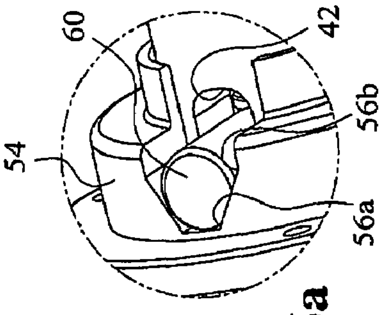
FIG. 6*a* is a partial enlarged view of the encircled portion in FIG. 6.
Figure 6B:
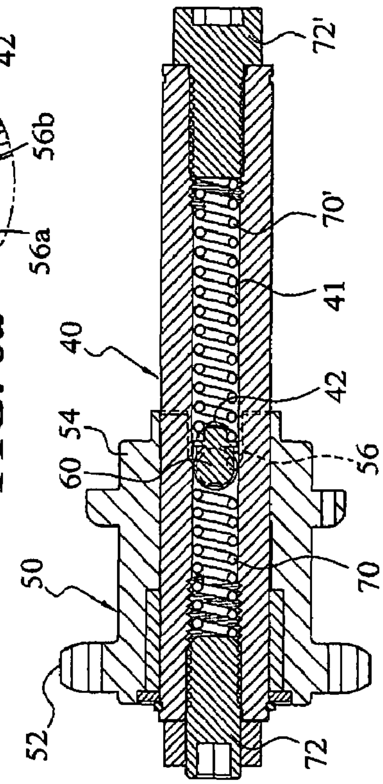
FIG. 6*b* is a schematic sectional view of the output shaft in FIG. 6.
Figure 5:
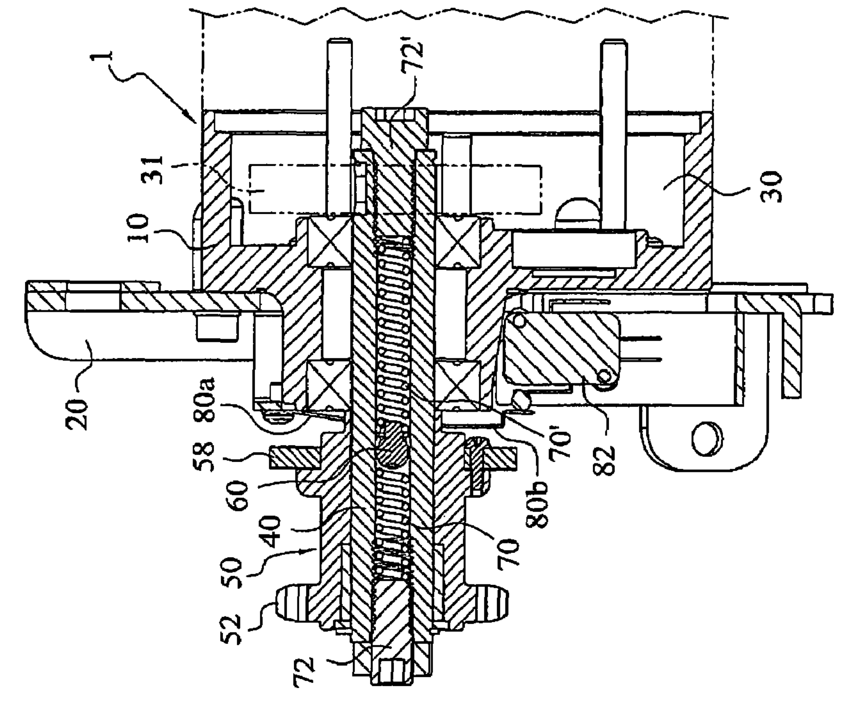
FIG. 5 is a schematic sectional view taken along the line 5-5 in FIG. 3, in which some components are omitted.

Referring to FIG. 6 to FIG. **6*b* of the present invention, the V-shaped slot 56 on the sleeve 54 includes a narrow portion 56*a* and a wide portion 56*b*, which is formed as an increasing larger opening from the narrow portion 56*a* toward the wide portion 56*b*. The pressure of the pair of elastic elements 70, 70' against the sliding pin 60 should be adjusted for balance. In normal condition, both ends of the sliding pin 60 are engaged at the narrow portion 56*a* of the V-shaped slot 56 to drive the sprocket assembly. When the door is error started and jammed with the latch device, and under the situation that the rotation of the output shaft 40 of the door opener 1 can not drive the sprocket assembly 50, the torque of the output shaft 40 make the sliding pin 60 generate a component force to resist the potential energy of the elastic element 70', and sliding back along the gradually larger opening of the V-shaped slot 56 toward the wide portion 56*b*. The sliding pin presses the swaying plate 80 located outside the wide portion 56*b*during moving backward, and making the free end 80*b*trigger an obstacle sensing device 82 to cut off the ascending circuit. Reversed current is supplied by a conventional circuit so that the door opener 1 rotates in opposite direction to cause the door to slide down and return to the original position. The door opener 1** can be re-started after the jammed condition is removed.

Moreover, according to the present invention, the force of the pair of elastic elements 70, 70' against on the sliding pin 60 is based on the weight of the door, and is selected from the elastic elements with suitable elastic force, such as coil spring. The force against the sliding pin 60 can be adjusted by the bolt 72, 72' at the outside of the pair of elastic elements 70, 70', so that the sliding pin 60 has the sensitivity corresponding to the weight of the door. With the above-mentioned structure, the sensitivity of the sliding pin 60 can be selectively adjusted by the bolt 72 located outside the output shaft 40 so as to be adapted to the weight of the door without the need to disassemble the door opener 1. Therefore, the defect of the prior art can be greatly improved.

Figure 7:
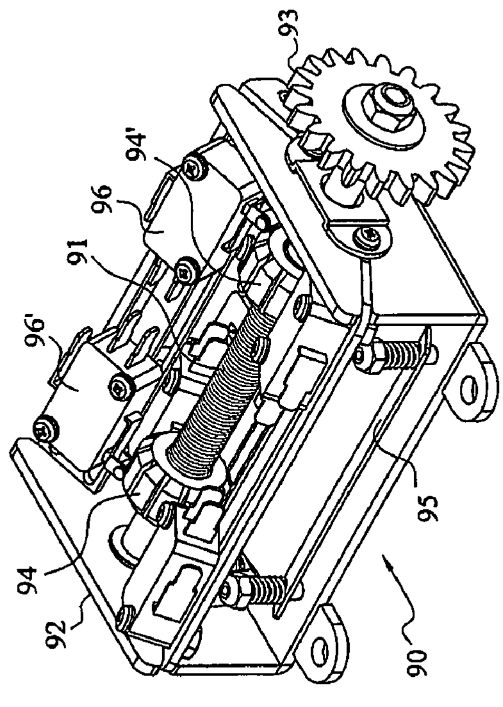
FIG. 7 is a three dimensional view of the limit switch according to the present invention.
Figure 7A:
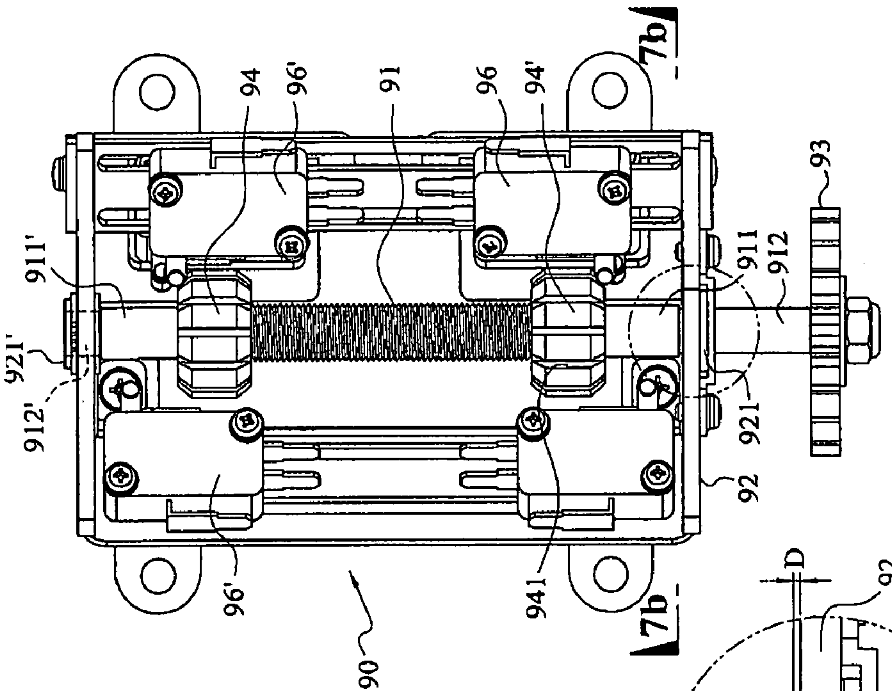
FIG. 7*a* is a schematic plane view of the limit switch in FIG. 7.
Figure 7B:
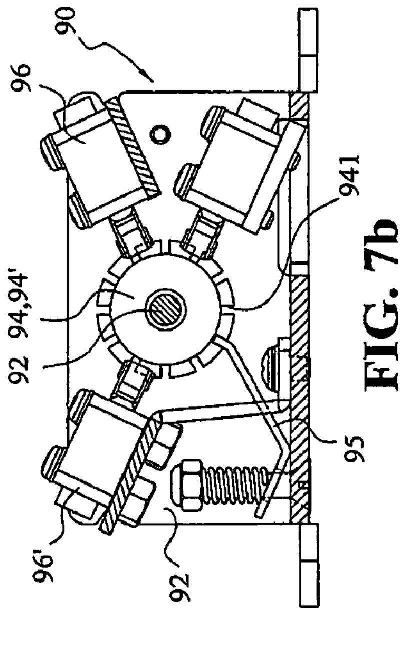
FIG. 7*b* is a schematic sectional view taken along the line 7*b*-7*b* in FIG. 7*a*.
Figure 7C:
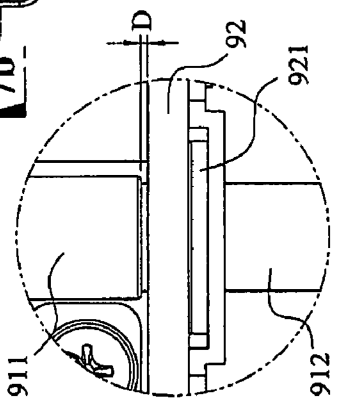
FIG. 7*c* is a partial enlarged view of the encircled portion in FIG. 7*a*.

Moreover, referring to FIG. 7 to FIG. **7*c* of the present invention, the sprocket assembly 50 further includes a gear 58 which rotates the gear 93 fixed on the shaft 912 of a conventional limit switch device 90 to control the level of upper stop point of the ascending stroke of the door or the level of lower stop point of the descending stroke. The limit switch device 90 comprises a screw rod 91 with both ends journaled on a frame 92, in which one end 912 is extended outside the frame 92 and a gear 93 fixed at the end 912 meshes with the gear 58 of the sprocket assembly 50. Each of a pair of switch actuators 94, 94' has several axial slots 941 on the peripheral surface, and the center of each of the switch actuator 94, 94' has screw hole engaged with the screw rod 91 respectively. A restrain plate 95 having one end fixed on the frame 92 and the other end being engaged in the slot 941 of the pair of switch actuators 94, 94' to stop the synchronous rotation of the pair of the switch actuators 94, 94' with the screw rod 91, so that the pair of switch actuators 94, 94' moves axially along with the rotation of the screw rod 91. A plurality of limit switches 96, 96' are located at the positions where their control levers can be actuated by the pair of switch actuators 94, 94'** for the control of the level of the upper stop point of the ascending stroke of the door or the level of the lower-stop-point of the descending stroke.

According to the present invention, both ends of the screw rod 91 are formed with a large diameter portion 911, 911' and a small diameter portion 912, 912' respectively. The small diameter portions 912, 912' are journaled in the pair of bearing portions 921, 921' on the frame 92 respectively. The large diameter portions 911, 911' are located between the pair of bearing portions 921, 921', and each has a clearance D with the sidewall of the frame, which can generate a delay effect of the pair of slides 94, 94' relative to the gear 93. When the ascending stroke or the descending stroke of the door is started, the gear 93 will be driven to rotate the screw rod 91. Under the condition the restrain plate 95 engages with the slot 941 of the pair of switch actuators 94, 94' and the friction force of the pair of switch actuators 94, 94' with respect to the screw rod 91 is larger than the friction force of the screw rod 91 with respect to the bearing portions 921, 921', a displacement equivalent to the clearance D is generated on the screw rod when the screw rod 91 starts to rotate. When the displacement is offset by the clearance D, then the pair of switch actuator 94, 94' displaced axially accompanying with the rotation of screw rod 91. Thus, the pair of the switch actuators 94, 94' will delay to move after the gear 93 rotates about 1~2 revolutions.

According to the present invention, the circuit of the obstacle sensing device 82 is connected in series with the normally closed contact of the lower limit switch of the door. When the door switch is actuated and the door leaves the lower stop point, the normally closed contact of the lower limit switch will become opened. In order that obstacle sensing device 82 maintains an effective detection distance, the limit switch device 90 is designed in such a manner that the switch actuator 94, 94' delays to move about 1~2 revolutions of the gear 93, so as to extend the time of an effective detection distance of the obstacle sensing device 82. This is simpler and more effective than the prior art which employs a delay circuit to extend the time of an effective detection distance.

The above error start prevention device for the door opener, can be applied to all electrically actuated doors for such as rolling door or garage door ascending and descending in vertical direction, or the rolling door winding in horizontal direction, or the garage door opening and closing bent in 90 degree direction. The foregoing are the preferred embodiments for the description of the present invention only, which are not intend to limit the scope of the present invention. The variations and modifications which are made without departing from the scope and the spirit of the claims of the present invention should be considered to be within the scope of the present invention.

EXPLANATION OF MAIN COMPONENTS

1 door opener
10 housing
20 base
30 gear box
31 last gear
40 output shaft
41 accommodation portion
42 sliding slot
50 sprocket assembly
52 chain
54 sleeve
56 v-shaped slot
**56*a*** narrow portion
**56*b*** wide portion
58 gear
60 sliding pin
70 elastic element
70' elastic element
72 bolt

72' bolt
80 swaying plate
**80*b*** free end
82 obstacle sensing device
90 limit switch device
91 screw rod
92 frame
93 gear
94 slide
94' slide
941 sliding slot
95 restrain plate
96 limit switch
96' limit switch
911 large diameter portion
911' large diameter portion
912 small diameter portion
912' small diameter portion
921 bearing portion
921' bearing portion

I claim:

1. An error start prevention device for door opener, in which the door opener (1) has a housing (10) with one end having a fixing base (20) and the other end receiving a power unit, a gear box (30) being located between the two ends, and the gear box (30)including a gear set and a last gear (31) that the driving force of the power unit is transmitted to;

wherein said error start prevention device comprises:

an output shaft (40) journaled on the housing (10), on one end being extended into the gear box (30) and fixed at the center of the last gear (31), the other end being extended and mounted outside the base (20), the center of the output shaft (40) being formed as hollow to serve as an accommodation portion (41) and having as a pair of axial sliding slots (42) on the periphery along the radial direction through the accommodation portion (41);

a sprocket assembly (50) rotationally invaginated outside the output shaft (40), one end having a sprocket (52) for driving the reel of the door, and the other end being integrally formed with a sleeve (54), the periphery of the sleeve (54) being formed with a pair of V-shaped slots (56) which corresponds to the sliding slot (42) on the output shaft (40), said v-shaped slots (56) each including a narrow portion (**56*a*) and a wide portion (56*b*); a sliding pin (60) radially inserted, in the sliding slot (42) with both ends protruded and latched in the V-shaped slots (56**) respectively;

a pair of elastic elements (70, 70') received in the accommodation portions (41) at both ends of the output shaft (40), and the outer end of each elastic element being fixed by a bolt (72, 72'), and the inner end of each elastic element abuts against the sliding pin (60) so as to urge the pin into the narrow portions (**56*a*) of the V-shaped slots (56**);

a swaying plate (80)located at the position that the sliding pin (60) can abut against it, one end (**80*a*) being fixed on the base (20), and the other end (80*b***) being a free end;

an obstacle sensing device (82)located at the position that the free end (**80*a*) of the swaying plate (80) can abut against it, when the rotation of the door opener (1) is stopped due to error start and the torque of the sliding pin (60) is limited, the sliding pin (60) slides back toward the direction of the gradually larger opening of wide portion (56*b*) of the V-shaped slot (56) to press the swaying plate (80) and to trigger the obstacle sensing device (82) to cut off the circuit, and simultaneously supply reverse current to the door opener (1) so that the door opener (1**) rotates in opposite direction to cause the door plate slideing down and returning to the original position.

2. An error start prevention device for door opener according to claim 1 wherein the V-shaped slot (56) is formed as a gradually larger opening in the direction from the narrow portion (**56*a*) to the wide portion (56*b*), and the swaying plate (80**) is located outside the opening.

3. An error start prevention device for door opener according to claim 2, wherein with the latch device (72, 72') for adjusting the force exerted by elastic elements (70, 70') against the sliding pin (60) is adjusted by said bolt (72,72').

4. An error start prevention device for door opener according to claim 3, wherein the elasticity of said elastic elements (70, 70') is suitably selected according to the weight of the door.

5. An error start prevention device for door opener according to claim 4, wherein said obstacle sensing device (82) is a micro-switch.

6. An error start prevention device for door opener according to claim 1, wherein said sprocket assembly (50) further includes a gear (58) used for the actuation of a limit switch device (90) to control the level of the upper stop point of the ascending stroke of the door or the level of the lower stop point of the descending stroke.

7. An error start prevention device for door opener according to claim 6, wherein said limit switch device (90) has a screw rod (91) with both ends journaled on a frame (92), one end being extended outside the frame (92), and a gear (93) fixed at the end meshing with said gear (58) of the sprocket assembly (50); a pair of switch actuator (94, 94'), each of which is formed with several axial sliding slots (941) on the peripheral surface and the center of each has a screw hole engaged with the screw rod (91); a restrain plate (95) having one end fixed on the frame (92) and the other end engaged in the axial slot (941) of the pair of switch actuator (94, 94') so that the pair of slides (94, 94') move axially along with the rotation of said screw rod (91); and a plurality of limit switches (96, 96') located at the positions where their control levers can be actuated by the pair of switch actuators (94, 94').

8. An error start prevention device for door opener according to claim 7, wherein both ends of said screw rod (91) are formed with a large diameter portion (911, 911') and a small diameter portion (912, 912') respectively, the small diameter portions (912, 912') being journaled in a pair of bearing portions (921, 921') on the frame (92) respectively, the large diameter portions (911, 911') being located between the pair of bearing portions (921, 921') and each having a clearance (D) with the sidewall of the frame.

9. An error start prevention device for door opener according to claim 8, wherein the pair of switch actuatorsslides (94, 94') and the gear (93) are in asynchronous motion.

10. An error start prevention device for door opener according to claim 9, wherein the pair of switch actuators (94, 94') delay to move after the rotation of said gear (93).

* * * * *